(12) United States Patent
Lan et al.

(10) Patent No.: US 11,296,637 B2
(45) Date of Patent: Apr. 5, 2022

(54) CONTROL DEVICE

(71) Applicants: Nidec Corporation, Kyoto (JP); Nidec Elesys Corporation, Kawasaki (JP)

(72) Inventors: Linfeng Lan, Kyoto (JP); Tomonari Mori, Kyoto (JP); Ryo Itaba, Kyoto (JP); Tokuji Tatewaki, Kawasaki (JP)

(73) Assignees: NIDEC CORPORATION, Kyoto (JP); NIDEC ELESYS CORPORATION, Kanagawa (JP)

( * ) Notice: Subject to any disclaimer, the term of this patent is extended or adjusted under 35 U.S.C. 154(b) by 233 days.

(21) Appl. No.: 16/733,259

(22) Filed: Jan. 3, 2020

(65) Prior Publication Data
US 2020/0313594 A1 Oct. 1, 2020

(30) Foreign Application Priority Data

Mar. 29, 2019 (JP) .............................. JP2019-068245

(51) Int. Cl.
*H02P 6/00* (2016.01)
*H02P 23/04* (2006.01)

(52) U.S. Cl.
CPC ................................... *H02P 23/04* (2013.01)

(58) Field of Classification Search
CPC .............................. H02P 23/04; H02P 23/20
USPC ........................................................ 318/702
See application file for complete search history.

(56) References Cited

U.S. PATENT DOCUMENTS

| 2006/0061310 A1* | 3/2006 | Takai | B60L 15/2045 318/139 |
| 2013/0338866 A1* | 12/2013 | Ozaki | B60L 15/20 701/22 |
| 2016/0068081 A1* | 3/2016 | Li | B60L 15/025 701/22 |
| 2018/0037256 A1* | 2/2018 | Maeda | B62D 15/025 |

FOREIGN PATENT DOCUMENTS

JP 2005-269836 A 9/2005

* cited by examiner

*Primary Examiner* — Kawing Chan
*Assistant Examiner* — Gabriel Agared
(74) *Attorney, Agent, or Firm* — Keating & Bennett (57) ABSTRACT

A control device includes angular velocity detecting circuitry, feedback circuitry, torque command calculation circuitry, a limiter, a drive controller, and correction circuitry. The angular velocity detecting circuitry detects an angular velocity of a motor. The feedback circuitry obtains a feedback value from the angular velocity. The torque command calculation circuitry obtains a torque command value according to a superordinate torque command value supplied from a superordinate device and the feedback value. The limiter limits the torque command value obtained by the torque command calculation circuitry so as not to exceed a preset torque upper limit value. The drive controller performs a drive control of the motor according to the limited torque command value. The correction circuitry corrects the superordinate torque command value or the torque command value according to the feedback value and the superordinate torque command value.

3 Claims, 8 Drawing Sheets

CONTROL DEVICE

CROSS REFERENCE TO RELATED APPLICATION

The present application claims priority under 35 U.S.C. § 119 to Japanese Application No. 2019-068245 filed on Mar. 29, 2019, the entire contents of which are hereby incorporated herein by reference.

1. FIELD OF THE INVENTION

The present disclosure relates to a control device performing a drive control of a motor.

2. BACKGROUND

In a control device performing a drive of a motor, if a vibration component is included in a drive current of the motor, an unnecessary vibration is generated, and so it is desirable to remove the vibration component from the drive current of the motor. In order to suppress the vibration, non-interference control may also be used to control the drive current of the motor.

In addition, in the motor drive control, a limiter which is configured so that a torque command value does not exceed an upper limit torque value may be provided for protecting the motor, an inverter, and the like.

For this reason, depending on the torque command value, a vibration suppression signal applied to the torque command value by the non-interference control is limited by the limiter, and so a vibration suppressing effect may be lowered. In the prior art, in order to effectively suppress the vibration of the vehicle when the torque command value is limited, characteristics of the limiter that limits the torque command value have been modified according to properties of the vehicle.

However, in the conventional motor drive control, since the limiter characteristics are changed for each vehicle, there is a problem that the calculation becomes complicated and a processing load is thus increased.

Furthermore, when the torque command is limited by a simple limiter, there is a problem that the vibration suppressing effect is lowered.

SUMMARY

A control device according to one example embodiment of the present disclosure may include angular velocity detecting circuitry, feedback circuitry, torque command calculation circuitry, a limiter, a drive controller, and correction circuitry. The angular velocity detecting circuitry may detect an angular velocity of a motor. The feedback circuitry obtains a feedback value from the angular velocity detected by the angular velocity detecting circuitry. The torque command calculation circuitry obtains a torque command value according to a superordinate torque command value supplied from a superordinate device and the feedback value obtained by the feedback circuitry. The limiter limits the torque command value obtained by the torque command calculation circuitry so as not to exceed a preset torque upper limit value. The drive controller may perform a drive control of the motor according to the torque command value limited by the limiter. The correction circuitry may correct the superordinate torque command value or the torque command value according to the feedback value obtained by the feedback circuitry and the superordinate torque command value.

According to example embodiments of the present disclosure, it is possible to prevent the vibration suppressing effect from being lowered in the motor drive control using a limiter having a simple configuration.

The above and other elements, features, steps, characteristics and advantages of the present disclosure will become more apparent from the following detailed description of the example embodiments with reference to the attached drawings.

DETAILED DESCRIPTION

Figure 1:
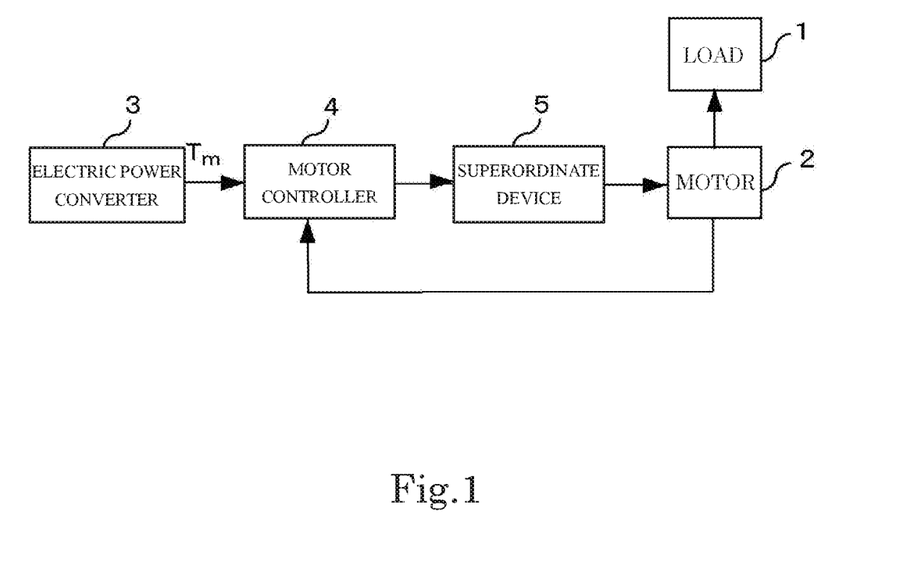
FIG. 1 is a block diagram showing a configuration example of a motor control system according to a first example embodiment of the present disclosure.

Hereinafter, example embodiments for implementing the present disclosure will be described in detail with reference to the accompanying drawings. FIG. 1 is a block diagram showing a configuration example of a motor control system employing a control device according to a first example embodiment of the present disclosure. This motor control system includes a motor 2 to be controlled that drives a load 1, a superordinate device 3 generating a superordinate torque command value for the motor 2, a motor controller 4 controlling a drive of the motor according to a superordinate torque command value $T_m$ from the superordinate device 3 and a status of the motor 2, and an electric power converter 5 supplying a drive current to the motor 2 according to a control of the motor controller 4.

The motor 2 drives, for example, an electric vehicle, and is configured from, for example, a three-phase brushless motor. In addition, for example, in the case of the electric vehicle, the superordinate device 3 is comprised of a VCU (vehicle control unit) that generates the superordinate torque command value corresponding to an accelerator opening, a current vehicle velocity, or the like. Also, the motor 2 may also be a motor that drives a robot arm and the like. Furthermore, other motors such as a DC motor to which a brush is attached, or the like may also be employed as the motor 2. In addition, the electric power converter 5 is composed of, for example, an inverter, and performs a switching of a power voltage in accordance with a current control from the motor controller 4 and then supplies it to the motor 2.

Figure 2:
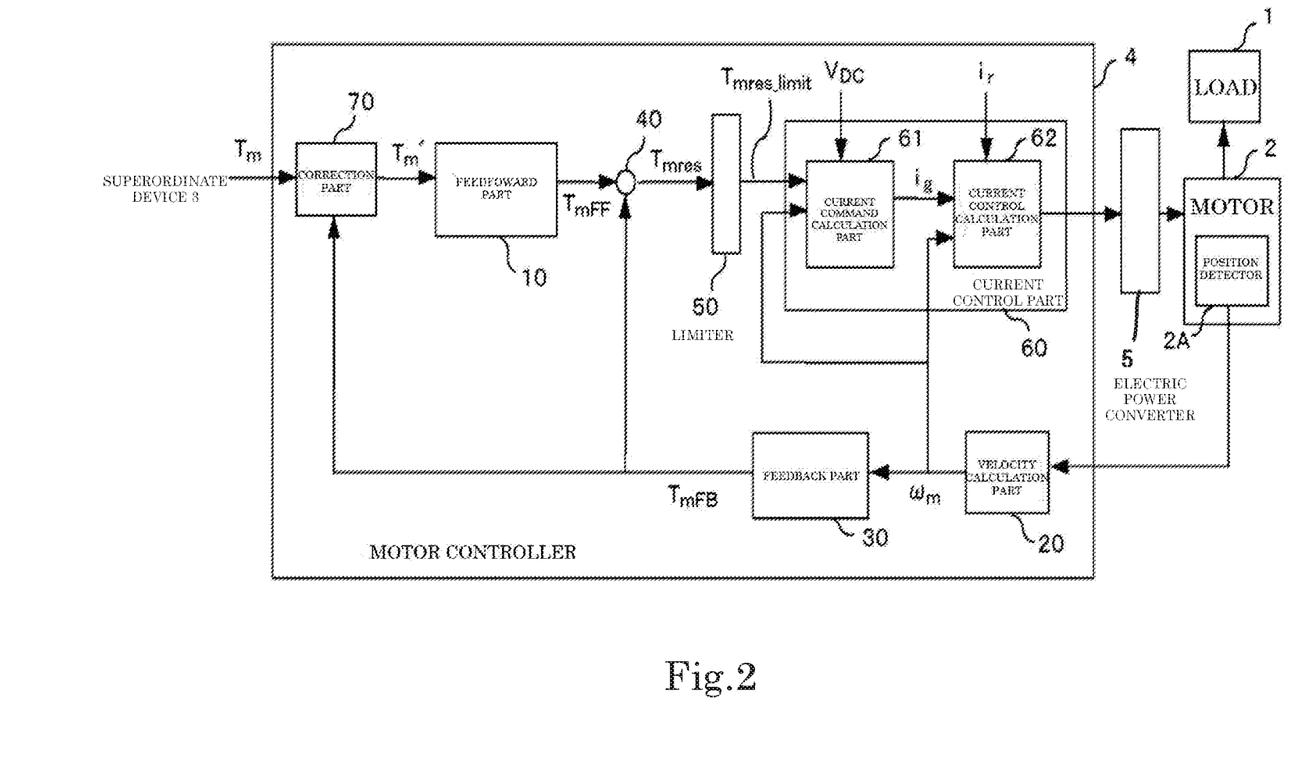
FIG. 2 is a block diagram showing a configuration example of a motor controller defining the motor control system.

FIG. 2 is a block diagram showing a configuration example of the motor controller 4. The motor 2 is provided with a field coil generating a magnetic field according to a drive current supplied from the electric power converter 5, a permanent magnet attached to a rotor, and the like, and generates a driving force according to the magnetic field generated by the field coil. In addition, the motor 2 is provided with a position detector 2A detecting a position (angle) of the rotor.

The motor controller 4 includes a feedforward circuitry 10 configured to obtain a feedforward torque command value $T_{mFF}$ corresponding to the superordinate torque command value $T_m$ from the superordinate device 3, a velocity calculation circuitry 20 configured to obtain an angular velocity $\omega_m$ of the motor 2 from a detection output of the position detector 2A, a feedback circuitry configured to obtain a feedback torque command value $T_{mFB}$ corresponding to the angular velocity $\omega_m$ of the motor 2, and a calculation circuitry 40 configured to obtain a torque command value $T_{mres}$. In addition, the motor controller 4 includes a limiter configured to limit the torque command value $T_{mres}$ from the calculation circuitry 40 so as not to exceed a preset threshold value, a current controller 60 configured to perform a control of the drive current, which is supplied to the motor 2, according to the torque command value $T_{mres}$ and the like, and a correction circuitry 70 configured to correct the superordinate torque command value $T_m$ from the superordinate device 3.

In this motor control system, a control is performed by the current controller 60 on the basis of the torque command value $T_{mres}$ obtained from the feedforward torque command value (feedforward value) $T_{mFF}$ from the feedforward circuitry 10 and the feedback torque command value (feedback value) $T_{mFB}$ from the feedback circuitry 30, and so a non-interference control for suppressing a vibration of the motor 2 is performed.

The limiter 50 limits the torque command value $T_{mres}$ from the calculation circuitry 40 so as not to exceed a preset threshold value $T_{lim}$, and then supplies it to a current command calculation circuitry 61. This threshold value $T_{lim}$ is, for example, an upper limit torque value of the motor 2. Alternatively, the threshold value $T_{lim}$ may also be set using, for example, the upper limit torque value and an upper limit current value of the motor 2.

The current controller 60 includes the current command calculation circuitry 61 configured to obtain a current command value $i_g$ according to a torque command value $T_{mres\_limit}$ supplied via the limiter 50 and the angular velocity $\omega_m$ of the motor 2 obtained by the velocity calculation circuitry 20, and a current control calculation circuitry 62 configured to perform a control of a drive current, which drives the motor 2, according to the current command value $i_g$ and the angular velocity $\omega_m$ of the motor 2 obtained by the velocity calculation circuitry 20. The current control calculation circuitry 62 controls the power converter 5 according to, for example, the current command value $i_g$ to perform a PWM (pulse width modulation) control of the driving current.

In the motor control system configured as described above, when the superordinate torque command value $T_m$ is supplied from the superordinate device 3, the motor controller 4 controls a drive of the motor 2 according to the superordinate torque command value $T_m$ and the angular velocity $\omega_m$ of the motor 2. Specifically, the correction circuitry 70 corrects the superordinate torque command value $T_m$, which is supplied from the superordinate device 3, every preset time intervals, and supplies a corrected superordinate torque command value $T_{m'}$ to the feedforward circuitry 10. As will be described later, in addition, this correction is performed as necessary so that the torque command value $T_{mres}$ does not exceed a threshold value of the limiter 50. The feedforward circuitry 10 obtains the feedforward torque command value $T_{mFF}$ corresponding to the superordinate torque command value $T_{m'}$, and supplies it to the calculation circuitry 40. The velocity calculation circuitry 20 obtains the angular velocity $\omega_m$ of the motor 2 from a detection output of the position detector 2A, and supplies it to the feedback circuitry 30 and the like. The feedback circuitry 30 obtains the feedback torque command value $T_{mFB}$ from the angular velocity $\omega_m$ of the motor 2, and supplies it to the calculation circuitry 40. The calculation circuitry 40 supplies the sum of the feedforward torque command value $T_{mFF}$ and the feedback torque command value $T_{mFB}$ to the limiter 50 as the torque command value $T_{mres}$. The limiter 50 limits the torque command value $T_{mres}$ so as not to exceed the preset threshold value, and supplies it to the current command calculation circuitry 61 as the torque command value $T_{mres\_limit}$.

The current command calculation circuitry 61 obtains the current command value $i_g$ from the torque command value $T_{mres}$ limit supplied via the limiter 50, the angular velocity $\omega_m$ from the velocity calculation circuitry 20 and a power voltage value $V_{DC}$, and supplies it to the current control calculation circuitry 62. The current control calculation circuitry 62 controls the electric power converter 5 according to the current command value $i_g$ supplied from the current command calculation circuitry 61. Specifically, according to a current value $i_t$ of the current supplied to the current control calculation circuitry 62, the current command value $i_g$ from the current command calculation circuitry 61 and the angular velocity $\omega_m$ from the velocity calculation circuitry 20, the current control calculation circuitry 62 controls a timing at which a switching caused by the electric power converter 5 is performed. Due to the above, the drive control according to the superordinate torque command value $T_m$ from the superordinate device 3 and the angular velocity $\omega_m$ of the motor 2 is performed.

Figure 3:
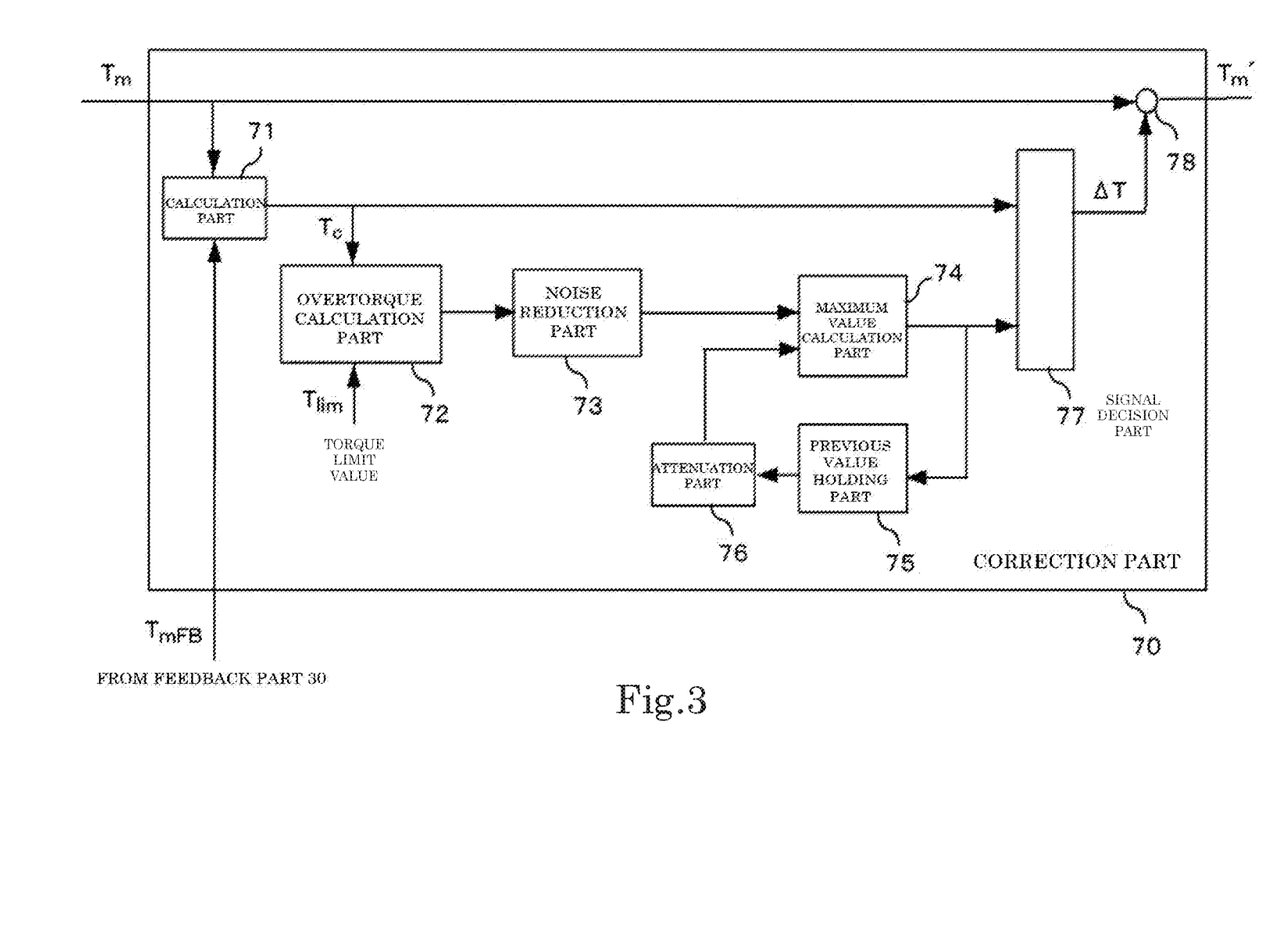
FIG. 3 is a block diagram showing a configuration example of correction circuitry defining the motor controller.

FIG. 3 is a block diagram showing a configuration example of the correction circuitry 70. The correction circuitry 70 includes a calculation circuitry 71 configured to perform a calculation in accordance with the superordinate torque command value $T_m$ from the superordinate device 3 and the feedback torque command value $T_{mFB}$, an overtorque calculation circuitry 72 configured to perform a calculation of whether or not overtorque, a noise reduction part 73 configured to reduce a gain of noise included in a calculation result of the overtorque calculation circuitry 72, and a maximum value calculation circuitry 74 configured to calculate a maximum value for selecting a correction amount $\Delta T$. The noise reduction part 73 is comprised of, for example, a low-pass filter and the like. In addition, the correction circuitry 70 includes a previous value holding part 75 configured to hold a correction value at the time of a previous processing, an attenuation part 76 configured to hold the value held in the previous value holding part 75, a sign decision part 77 configured to decide a sign of the correction amount, and a calculation circuitry 78 configured to correct the superordinate torque command value $T_m$ according to the correction amount $\Delta T$. Furthermore, the calculation circuitry 78 may also be configured as an addition part that adds the correction amount $\Delta T$ to the superordinate torque command value $T_m$.

Figure 4:
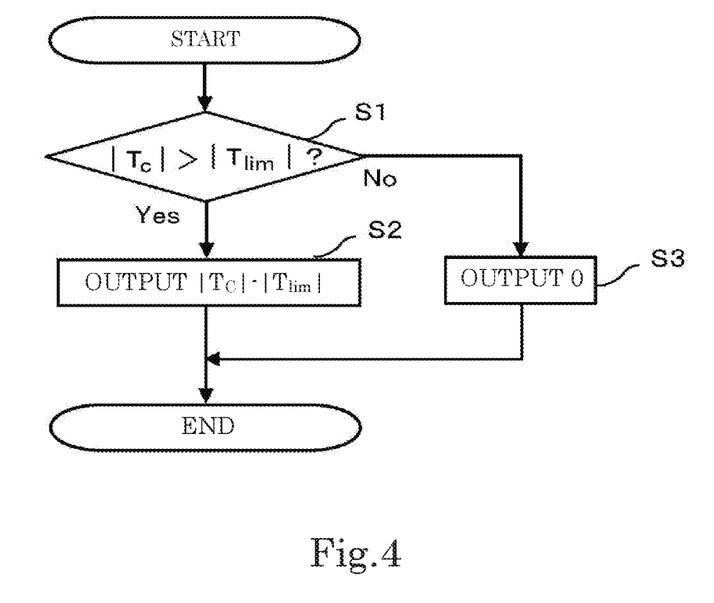
FIG. 4 is a flowchart showing an example of a calculation processing of whether or not overtorque in the correction circuitry.

FIG. 4 is a flowchart showing an example of calculation processing of whether or not overtorque, performed by the overtorque calculation circuitry 72 of the correction circuitry 70. The overtorque calculation circuitry 72 performs the processing shown in FIG. 4 at every preset time intervals. In the beginning of the processing, in the step S1, the overtorque calculation circuitry 72 performs comparison operation on an absolute value of the sum $T_c$ which is the sum of the superordinate torque command value $T_m$ and the feedback torque command value $T_{mFB}$ supplied from the calculation circuitry 71 and an absolute value of the threshold value $T_{lim}$ of the limiter 50, and decides whether the absolute value of the sum $T_c$ exceeds the absolute value of the threshold value $T_{lim}$ of the limiter 50.

When the absolute value of the sum $T_c$ exceeds the absolute value of the threshold value $T_{lim}$ of the limiter 50, in the step S2, the overtorque calculation circuitry 72 supplies a difference between the absolute value of the sum $T_c$ and the absolute value of the threshold value $T_{lim}$ of the limiter 50 to the maximum value calculation circuitry 74 via the noise reduction part 73. On the other hand, when the absolute value of the sum $T_c$ does not exceed the absolute value of the threshold value $T_{lim}$ of the limiter 50 in the step S1, the overtorque calculation circuitry 72 supplies the value of 0 to the maximum value calculation circuitry 74 via the noise reduction part 73 in the step S3. The above processing is repeated at every preset time intervals.

The noise reduction part 73 reduces the gain of noise of the value supplied from the overtorque calculation circuitry 72 every preset time intervals, and supplies it to the maximum value calculation circuitry 74. An output of the maximum value calculating part 74 at the time of the previous processing is kept in the previous value holding part 75. The attenuation part 76 attenuates the output of the maximum value calculation circuitry at the time of the previous processing and supplies the attenuated output to the maximum value calculation circuitry 74. In the processing performed by this attenuation part 76, a certain value may be subtracted from the value stored in the previous value holding part 75. Alternatively, the output may also be attenuated by another method such as a first-order lag system or the like.

The maximum value calculation circuitry 74 outputs the larger one of the value supplied from the overtorque calculation circuitry 72 via the noise reduction part 73 and the output, which is attenuated by the attenuation part 76, of the maximum value calculation circuitry 74 at the time of the previous processing. This output is supplied to the sign decision part 77 and the previous value holding part 75. The sign decision part 77 decides a sign of the correction amount $\Delta T$ on the basis of a sign of the input signal and supplies the correction amount $\Delta T$ including the obtained sign to the calculation circuitry 78. The calculation circuitry 78 corrects the superordinate torque command value $T_m$ on the basis of the supplied correction amount $\Delta T$, and supplies the corrected superordinate torque command value $T_{m'}$ to the feedforward circuitry 10.

Figure 5:
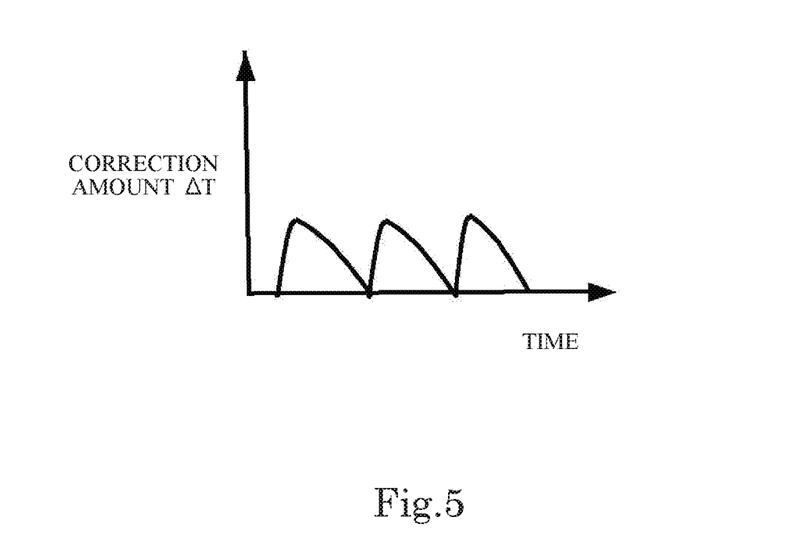
FIG. 5 is a diagram showing an example of a correction amount generated by the correction circuitry.
Figure 6:
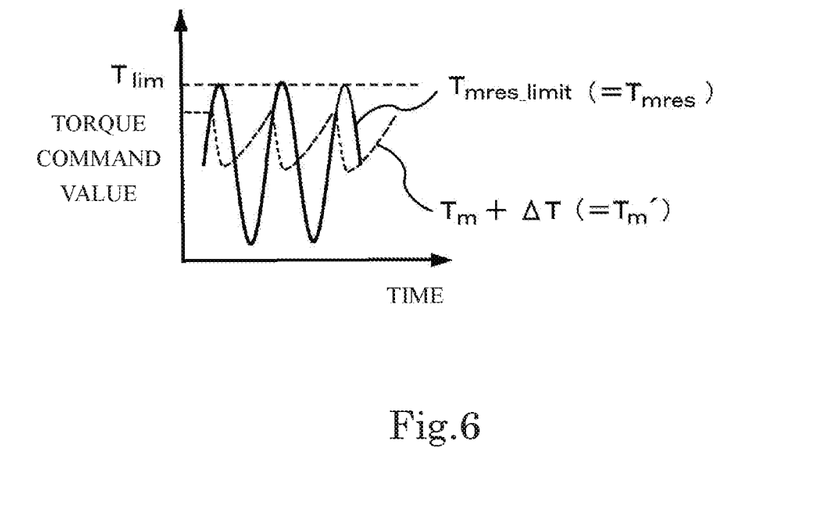
FIG. 6 is a diagram illustrating an example of a torque command value corrected by the correction circuitry.

FIG. 5 is a diagram illustrating an example of the correction amount $\Delta T$ generated by the correction circuitry using the above-described correction processing. In a case where the correction is not performed, this correction amount $\Delta T$ becomes a value which is increased in a time period in which the torque command value $T_{mres}$ exceeds the threshold value $T_{lim}$ of the limiter 50, and which is attenuated as time passes. By correcting the superordinate torque command value $T_m$ with the correction amount $\Delta T$ obtained as described above, for example, as shown in FIG. 6, the torque command value $T_{mres}$ does not exceed the threshold value $T_{lim}$ of the limiter 50. In addition, in this example, the sign decision part 77 makes the sign of the correction amount $\Delta T$ be negative, and the calculation circuitry 78 represents the result of adding the correction amount $\Delta T$, which is a negative value, to the superordinate torque command value $T_m$.

Figure 7:
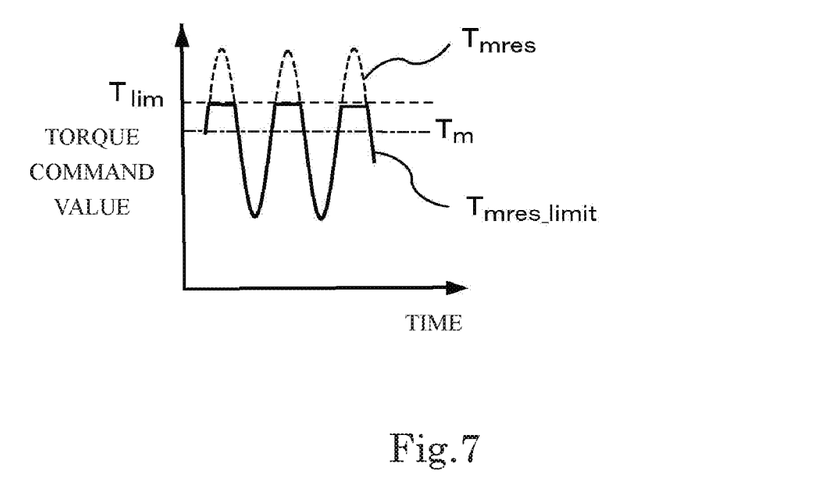
FIG. 7 is a diagram showing an example of a state in which the torque command value is limited by a limiter.

In contrast, when a correction of the superordinate torque command value $T_m$ is not performed, depending on a status of the superordinate torque command value $T_m$ and the feedback torque command value $T_{mFB}$, for example, as shown in FIG. 7, the torque command value $T_{mres}$ exceeds the threshold value $T_{lim}$ of the limiter 50 and the value of the torque command value is limited by the limiter 50. As a result, the vibration suppressing effect is lowered. In the present example embodiment, as described above, by correcting the superordinate torque command value $T_m$ so that the torque command value Torres does not exceed the threshold value $T_{lim}$ of the limiter 50, it is possible to prevent a vibration suppressing effect from being lowered in the motor drive control.

Figure 8:
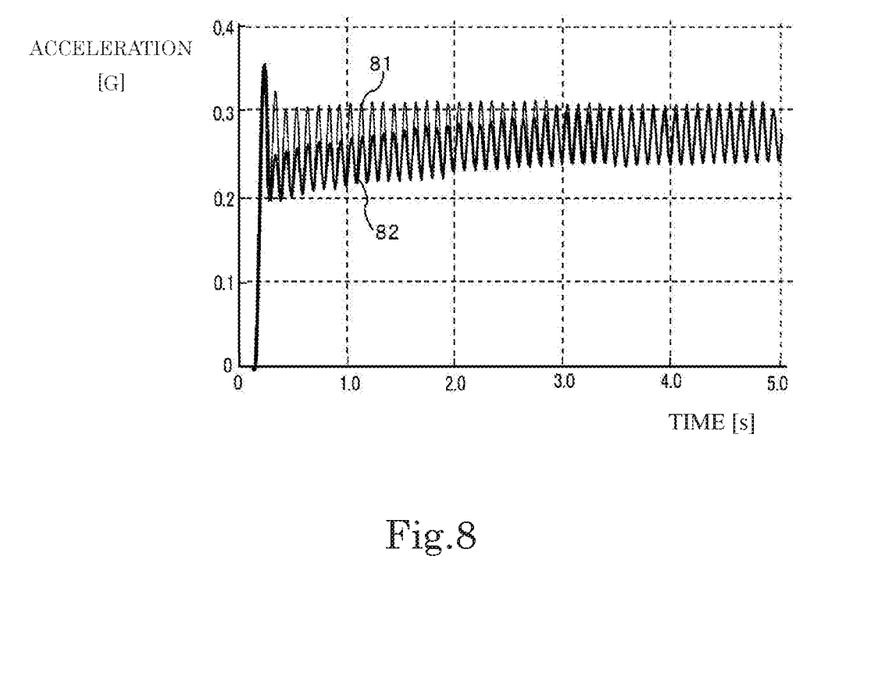
FIG. 8 is a diagram showing an example of an acceleration of a load driven by a motor due to a vibration according to an example embodiment of the present disclosure.
Figure 9:
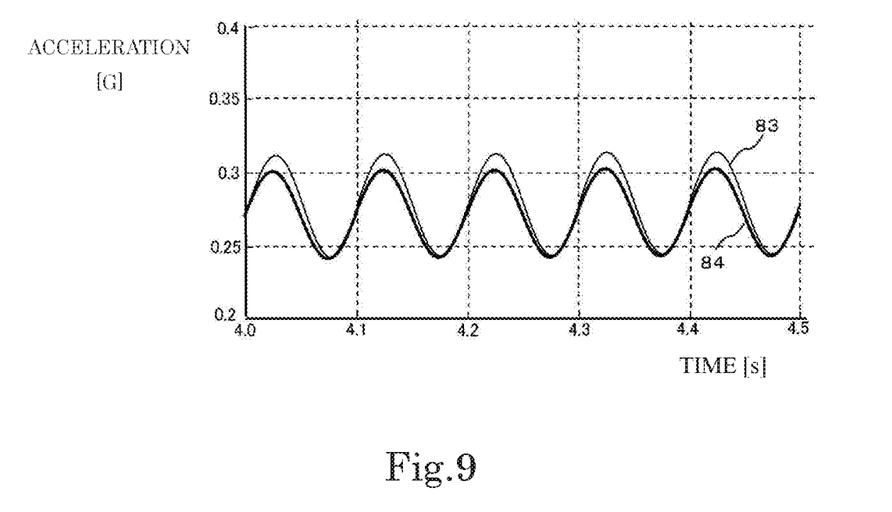
FIG. 9 is a diagram illustrating an example of an acceleration of the load driven by the motor due to vibration.

FIGS. 8 and 9 compare examples of acceleration of the load 1 driven by the motor 2 due to vibrations when the superordinate torque command value $T_m$ is not corrected and when the superordinate torque command value $T_m$ is corrected. For example, in the case of an electric vehicle, FIGS. 8 and 9 show examples of the acceleration of the electric vehicle. In addition, reference numeral 81 in FIG. 8 and reference numeral 83 in FIG. 9 indicate accelerations due to a vibration when the superordinate torque command value $T_m$ is not corrected, and reference numeral 82 in FIG. 8 and reference numeral 84 in FIG. 9 indicate the accelerations due to a vibration when the superordinate torque command value $T_m$ is corrected. As is apparent from the comparison between FIG. 8 and FIG. 9, the correction of the superordinate torque command value $T_m$ performed by the correction circuitry 70 can prevent the vibration suppressing effect from being lowered.

In addition, in the present example embodiment, by correcting the superordinate torque command value $T_m$ as described above, it is possible to prevent the vibration suppressing effect from being lowered in a drive control of the motor in which the torque command value is limited using the limiter having a simple configuration. Furthermore, in the present example embodiment, since a vehicle characteristic is not employed for a calculation of the correction amount performed by the correction circuitry 70, it is possible to suppress an increase in a processing load. Therefore, according to the present example embodiment, it is possible to prevent the vibration suppressing effect from being lowered while suppressing an increase in the processing load.

Figure 10:
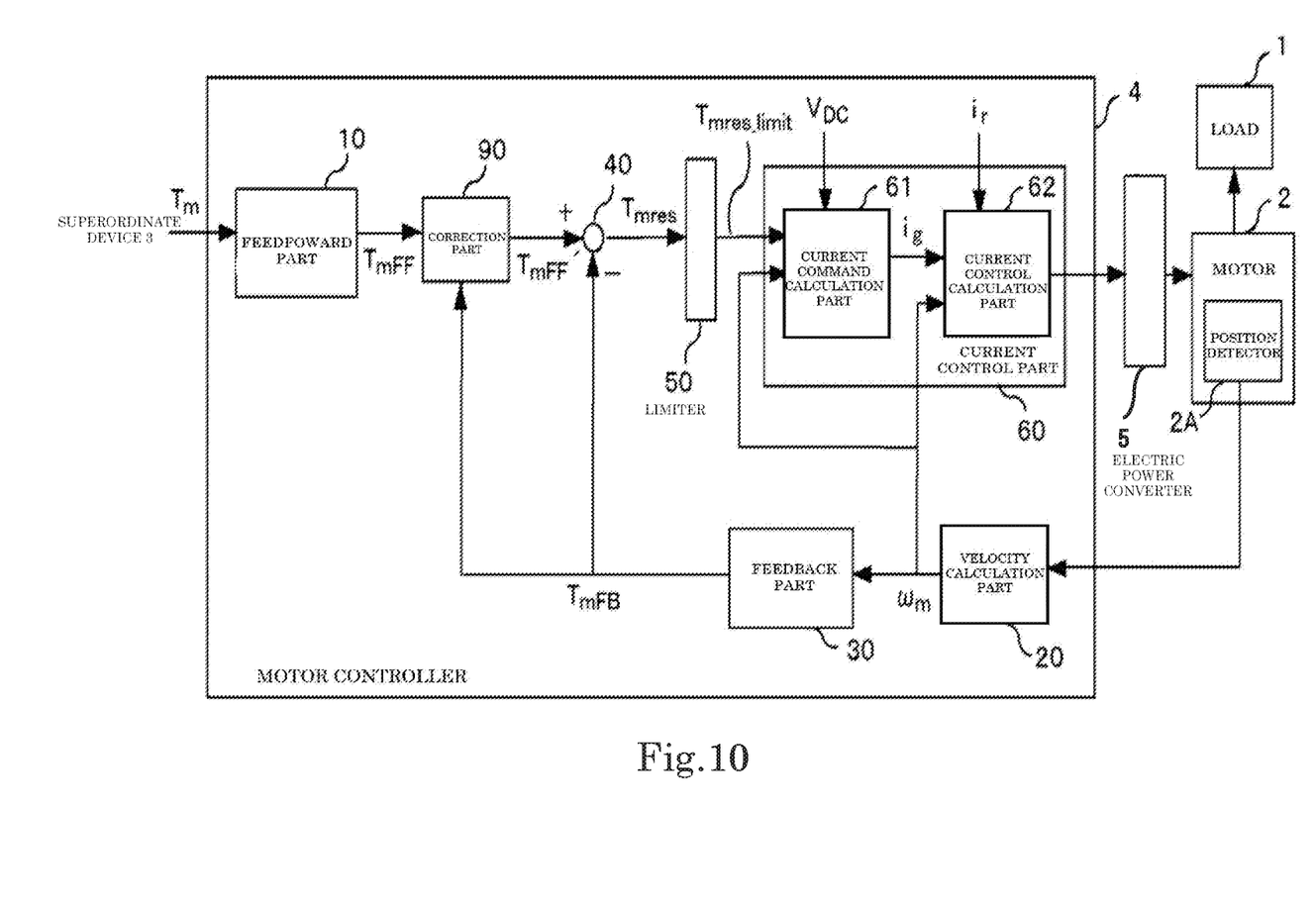
FIG. 10 is a block diagram illustrating a configuration example of a motor control system according to a second example embodiment of the present disclosure.

FIG. 10 is a block diagram showing a configuration example of the motor controller defining the motor control system of a second example embodiment of the present disclosure. Although, in the first example embodiment, the correction circuitry 70 is configured to correct the superordinate torque command value $T_m$ from the superordinate device 3, in the present example embodiment, a correction circuitry 90 is configured to correct the feedforward torque command value $T_{mFF}$ from the feedforward circuitry 10.

The correction circuitry 90 is configured in the same manner as the correction circuitry 70 shown in FIG. 3 described above, and is configured to obtain the correction amount $\Delta T$ according to the feedforward torque command value $T_{mFF}$ from the feedforward circuitry 10 and the feedback torque command value $T_{mFB}$ from the feedback circuitry 30, and to correct the feedforward torque command value $T_{mFF}$.

As described above, according to the present example embodiment, by correcting the torque command value according to the superordinate torque command value and the feedback value obtained by the feedback circuitry, as in the first example embodiment, it is possible to prevent the vibration suppressing effect from being lowered in the drive control of the motor in which the limiter having a simple configuration is used.

Figure 11:
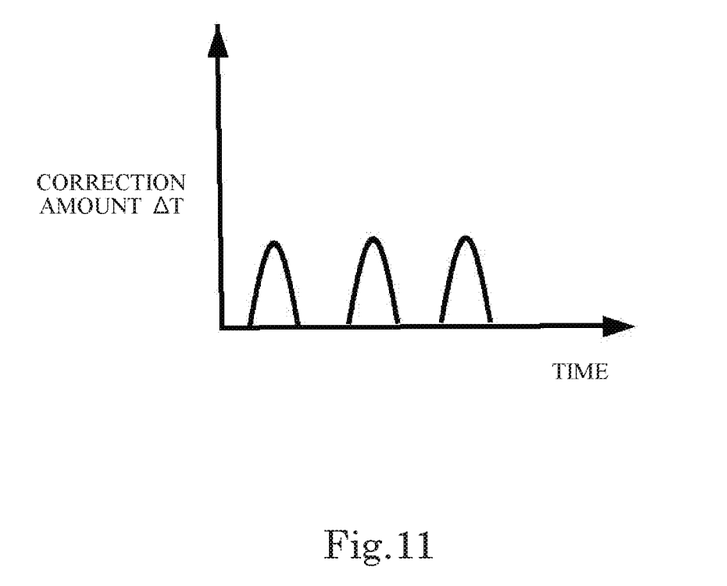
FIG. 11 is a diagram showing another example of the correction amount generated by the correction circuitry.

Although, in the above-described example embodiment, the example in which the correction amount $\Delta T$ illustrated in FIG. 5 is used has been described, for example, as illustrated in FIG. 11, it may also be preferable to use the correction amount $\Delta T$ with fast attenuation time. Since a great vibration suppressing effect is obtained in a time period in which a value of the feedback torque command value $T_{mFB}$ is increased, the correction may also be made so that the torque command value does not exceed the threshold value $T_{lim}$ of the limiter 50 in a time period in which a value of the feedback torque command value $T_{mFB}$ is increased. In order to generate such the correction amount $\Delta T$, for example, it is preferable to increase the attenuation amount obtained by the attenuation part 76 of the correction circuitry 70.

Figure 12:
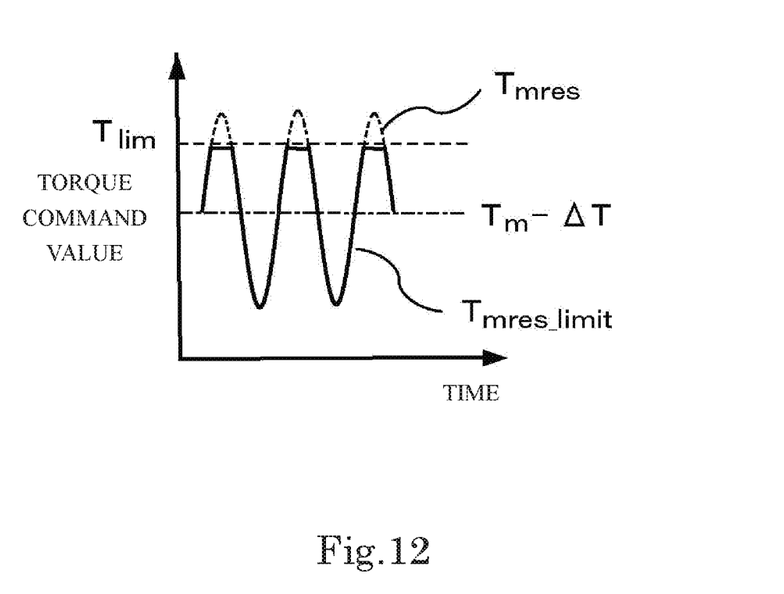
FIG. 12 is a diagram showing further another example of the correction amount generated by the correction circuitry.

In addition, it may also be preferable that the correction amount $\Delta T$ is a constant value. Due to the above, it is possible to maintain the vibration suppressing effect while further suppressing an increase in the processing load for correcting the torque command value. In this case, although the torque command value may also be corrected so that the corrected torque command value does not exceed the threshold value $T_{lim}$ of the limiter 50, for example, the correction amount $\Delta T$ may also be obtained so that a range in which the corrected torque command value exceeds the threshold value $T_{lim}$ of the limiter 50 should be equal to or less than a preset threshold value as shown in FIG. 12. Even if the corrected torque command value has exceeded the threshold value $T_{lim}$ of the limiter 50 to some extent, there is the vibration suppressing effect. Therefore, by using such the correction amount $\Delta T$, it is possible to maintain the value of the torque command value high overall, and to enhance the responsiveness to the superordinate torque command value. In addition, the extent to which the correction is performed by the correction circuitry may also be determined in comprehensive consideration of, for example, the required vibration suppressing effect, an amount of the processing load, the required responsiveness, and the like.

In addition, although the example in which the limiter for limiting the torque command value is provided has been described in each of the above-described example embodiments, without providing the limiter, the correction circuitry may also be configured to correct the superordinate torque command value or the torque command value so that the torque command value supplied to the current controller does not exceed the preset threshold value.

The circuitry of the example embodiments of the present disclosure may be implemented using a microprocessor, integrated circuits, discrete electronic components, or any combination thereof. Further, the circuitry may include a processor which executes a program stored in a non-transitory computer readable medium.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A control device comprising:
angular velocity detecting circuitry to detect an angular velocity of a motor;
feedback circuitry to obtain a feedback value from the angular velocity detected by the angular velocity detecting circuitry;
torque command calculation circuitry to obtain a torque command value according to a superordinate torque command value supplied from a superordinate device and the feedback value obtained by the feedback circuitry;
a limiter to limit the torque command value obtained by the torque command calculation circuitry so as to not exceed a preset torque upper limit value;
a drive controller to perform a drive control of the motor according to the torque command value limited by the limiter; and
correction circuitry to correct the superordinate torque command value or the torque command value according to the feedback value obtained by the feedback circuitry and the superordinate torque command value;
wherein the correction circuitry performs a correction so that the corrected torque command value does not exceed a preset threshold value;
wherein the correction circuitry comprises: detecting circuitry to detect whether the torque command value exceeds the preset threshold value based on the superordinate torque command value and the feedback value obtained by the feedback circuitry;
maximum value calculation circuitry to obtain a maximum value of the torque command value when the detecting circuitry detects that the torque command value exceeds the preset threshold value;
correction amount calculation circuitry to obtain a correction amount according to the maximum value of the torque command value obtained by the maximum value calculation circuitry; and
correction processing circuitry to correct the superordinate torque command value or the torque command value according to the correction amount obtained by the correction amount calculation circuitry.

2. The control device of claim 1, further comprising feedforward circuitry to obtain a feedforward value according to the superordinate torque command value, wherein the torque command calculation circuitry obtains the torque command value according to the feedforward value obtained by the feedforward circuitry and the feedback value obtained by the feedback circuitry.

3. A control device comprising:
angular velocity detecting circuitry to detect an angular velocity of a motor; feedback circuitry to obtain a feedback value from the angular velocity detected by the angular velocity detecting circuitry;
torque command calculation circuitry to obtain a torque command value according to a superordinate torque command value supplied from a superordinate device and the feedback value obtained by the feedback circuitry;

a drive controller to perform a drive control of the motor according to the torque command value; and correction circuitry to correct the superordinate torque command value or the torque command value according to the feedback value obtained by the feedback circuitry and the superordinate torque command value;

wherein the correction circuitry performs a correction so that the corrected torque command value does not exceed a preset threshold value;

wherein the correction circuitry comprises:

detecting circuitry to detect whether the torque command value exceeds the preset threshold value based on the superordinate torque command value and the feedback value obtained by the feedback circuitry;

maximum value calculation circuitry to obtain a maximum value of the torque command value when the detecting circuitry detects that the torque command value exceeds the preset threshold value;

correction amount calculation circuitry to obtain a correction amount according to the maximum value of the torque command value obtained by the maximum value calculation circuitry; and correction processing circuitry to correct the superordinate torque command value or the torque command value according to the correction amount obtained by the correction amount calculation circuitry.

* * * * *